Aug. 17, 1943.　　　H. W. MEADE　　　2,326,791
INTERNAL COMBUSTION ENGINE CONTROL
Filed April 3, 1940　　　2 Sheets-Sheet 2
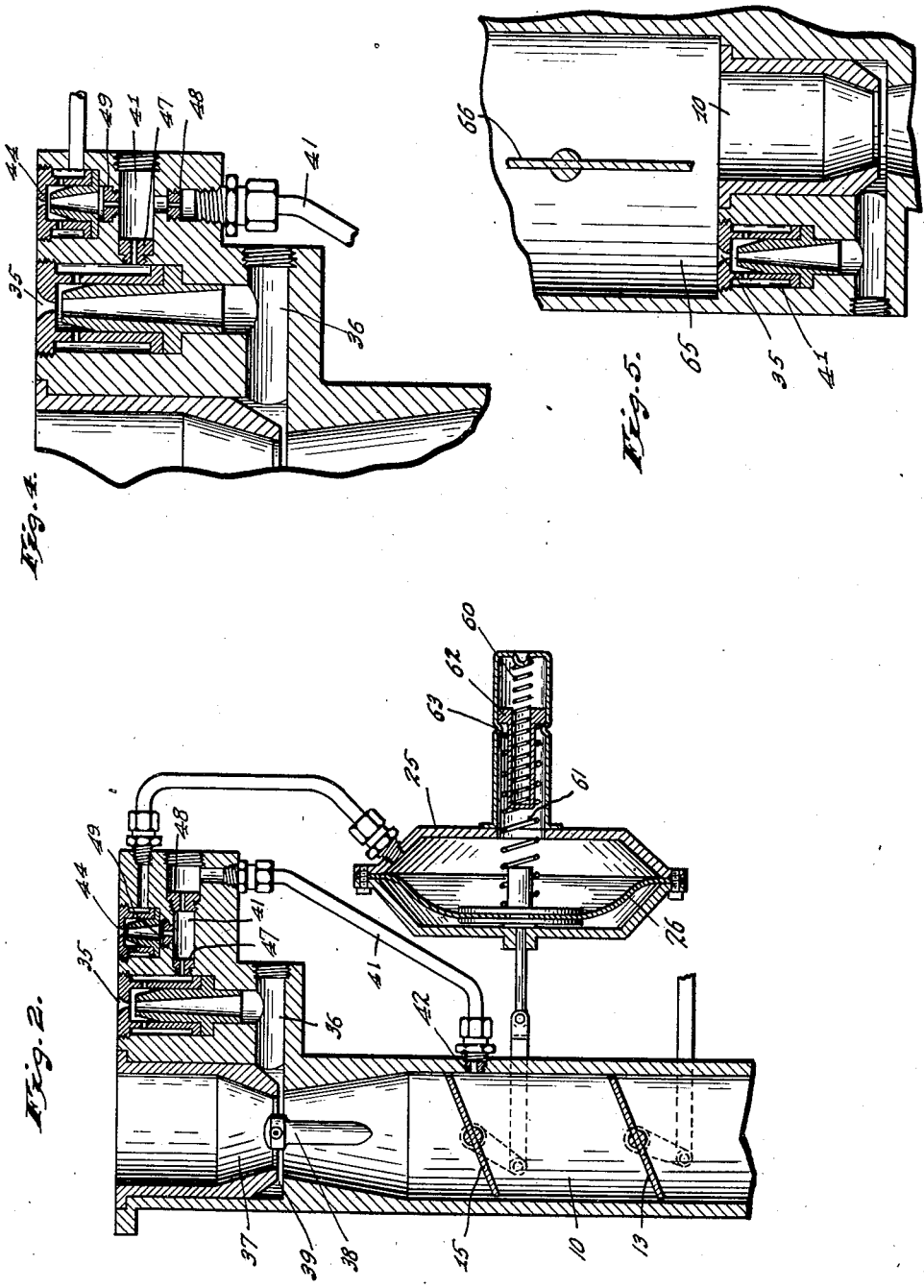
INVENTOR.
HAROLD W. MEADE,
BY
ATTORNEYS.

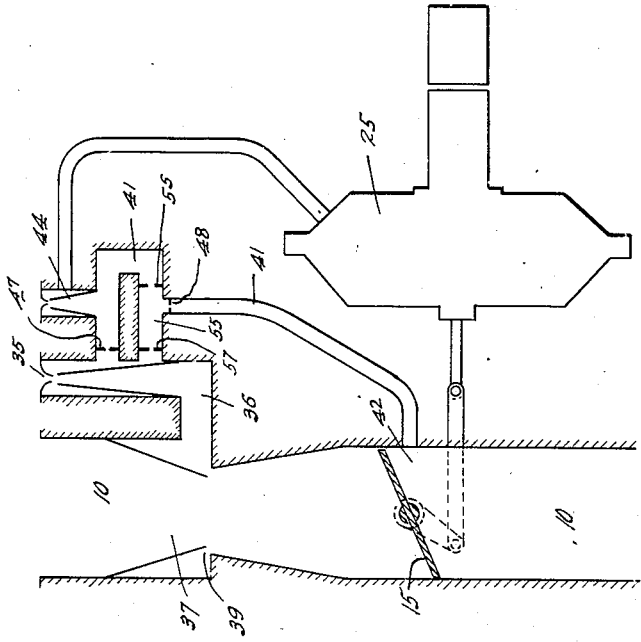
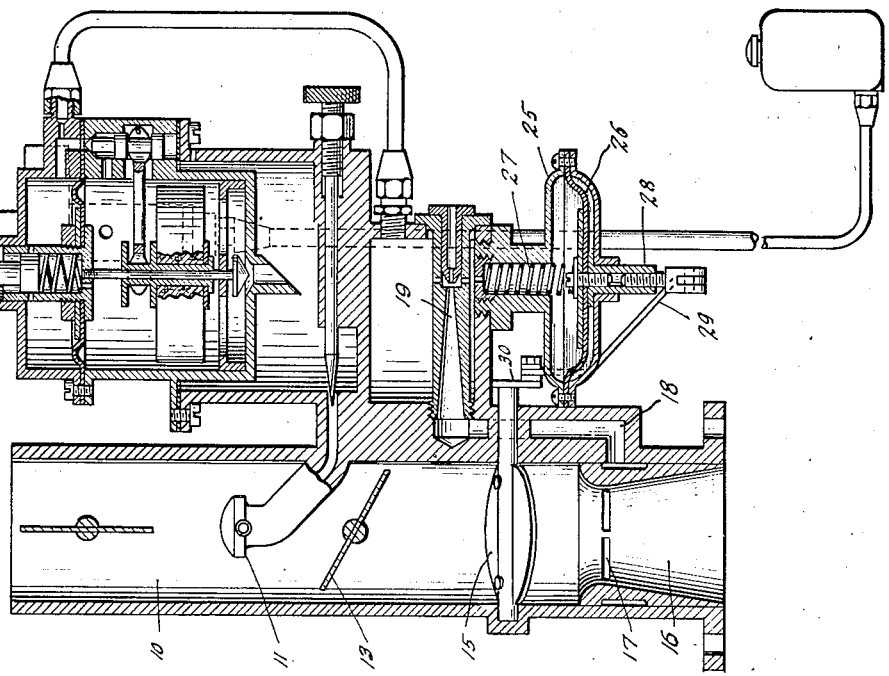

Patented Aug. 17, 1943

2,326,791

UNITED STATES PATENT OFFICE 2,326,791

INTERNAL COMBUSTION ENGINE CONTROL

Harold W. Meade, Covington, Ind.

Application April 3, 1940, Serial No. 327,577

14 Claims. (Cl. 123—119)

The present invention relates to control of the pressure of the explosive mixture supplied to an internal combustion engine, primarily for the purpose of improving the efficiency and general performance characteristics of the engine, and secondarily for the purpose of improving the performance of any devices which are operated or controlled, in whole or in part, by the vacuum existing in the intake manifold of the engine. This application is a continuation in part of my co-pending application Serial No. 101,214, filed September 17, 1936, now Patent No. 2,275,541, issued March 10, 1942.

As is well known, the torque exerted by an internal-combustion engine of conventional design varies in the same sense as the quantity of mixture supplied per cycle to each cylinder. It is also recognized that other conditions being constant, the efficiency of such an engine varies in the same sense as the cylinder pressure at the moment of ignition. When the engine is operating at slow speed with the throttle open, volumetric efficiency approaches 100% and the charge admitted to each cylinder is a maximum. As the speed of the engine increases, volumetric efficiency decreases and the charge supplied to each cylinder becomes less. As a result, compression pressures within the cylinder drop and the decreased charge burns with lessened efficiency.

In the conventional engine, the nominal compression-ratio—i. e., the ratio of the cylinder volume at crank-end dead center to the volume at head-end dead center—is determined by low-speed, high-load conditions; for it is under those conditions that volumetric efficiency and compression pressures are highest. The conventional engine cannot well be designed to produce optimum compresssion pressures—and therefore maximum efficiency of combustion—at medium and high speeds; because if it were, slow-speed, full-throttle operation would entail compression pressures great enough to cause pre-ignition.

My invention, therefore, has for its principal object the maintenance of compression pressures which, throughout the range of operating conditions, are more nearly uniform than are those which occur in prior engines of conventional design. More specifically, it is my object to produce an engine which will provide optimum compression pressures at the higher speeds and to equip such engine with means which will act automaticallly to decrease volumetric efficiency at low speeds and full-throttle, thereby preventing the introduction into the engine of charges sufficient in amount to cause excessive compression pressures and consequent pre-ignition. A further object of my invention is to improve the performance of any pressure-operated or pressure-controlled device connected to the intake manifold of the engine.

In carrying out my invention, I provide means, conveniently a throttle valve, for controlling the amount of mixture supplied to the engine; and I regulate this throttle valve automatically in such a way that the desired compression pressures will be maintained throughout the range of conditions under which the engine is to operate. In the preferred forms of the invention, such as are illustrated herein, regulation of the automatic throttle is provided by a pressure-responsive element responsive to pressures at a point, or to the joint effect of pressures at a plurality of points, in the intake conduit. The automatic throttle-regulating means, whatever its form may be, is arranged to regulate the throttle, and thereby to control static pressure, in such a manner that the weight of the charge supplied to the engine will never exceed a predetermined maximum. In the preferred forms of the invention, this maximum is not a fixed value throughout the entire range of engine speeds, but instead increases with increased engine speed.

The accompanying drawings illustrate my invention: Fig. 1 is a section through a charge-controlling mechanism suitable for use in conjunction with a vacuum-lift fuel system, such as forms the subject-matter of my Patent No. 2,275,541; Figs. 2 and 3 are sections, partly diagrammatic, illustrating different modifications of the invention; Fig. 4 is a fragmental section illustrating a further modification of the structure shown in Fig. 2; and Fig. 5 illustrates an arrangement which may be employed, where necessary, to prevent any pressure-controlling mechanism from interfering with the action of a choke-valve during starting.

In the arrangement illustrated in Fig. 1 the intake conduit 10 of the engine is shown as provided with a fuel-discharge nozzle 11 and, on the engine side of such fuel nozzle, with the conventional throttle 13, which may be manually controlled in the usual manner to regulate engine speed. In the device of Fig. 1, in which a vacuum fuel-feed is incorporated, I prefer to dispose the automatic throttle 15 between the manual throttle 13 and the engine, as illustrated. Beyond the automatic throttle 15 in the direction of mixture flow through the conduit 10 I dispose a venturi 16 the throat of which communicates through ports 17 with a passage 18 extending from an aspirator 19. The aspirator 19 is arranged to receive air from atmosphere, and its throat is connected to a pressure-responsive element in the form of a casing 25 across which a flexible diaphragm 26 extends. The throat of the aspirator 19 communicates with the casing 25 above the diaphragm 26; and a spring 27 acts on the diaphragm to bias it downwardly.

The diaphragm 26 is operatively connected with a stem 28 which extends through the lower wall of the casing 25 and is connected through a link 29 to an arm 30 on the shaft of the automatic throttle 15, the arrangement being such that upward movement of the diaphragm 26 will move the throttle 15 toward open position. As a result of this arrangement any vacuum at the throat of the aspirator 19 will tend to raise the diaphragm 26 and open the throttle in opposition to the force exerted on the diaphragm by the spring 27.

The primary function of the aspirator 19, so far as the present invention is concerned, is to increase the vacuum available for automatic regulation of the auxiliary throttle 15. A further advantage following from the use of the aspirator 19 is that changes in pressure at the throat of the venturi 16 will, as a general rule, induce much larger changes at the throat of the aspirator 19; and, as a result, the pressure-responsive element need not be so sensitive and delicate as it would have to be if responsive directly to the pressure at the throat of the venturi 16.

When an engine equipped with the device of Fig. 1 is operating, a sub-atmospheric pressure will exist at the throat of the venturi 16 and will induce a flow of air from the atmosphere through the aspirator 19 and the passage 18. The partial vacuum thus created at the throat of the aspirator 19 will be transmitted to the pressure-responsive element and will tend to open the auxiliary throttle 15 in opposition to the force exerted by the spring 27.

As will be obvious from the above description, the position of the auxiliary throttle 15 will depend upon the pressure at the venturi 16, the throttle being moved toward open position upon any drop in such pressure, and vice versa. Since closing movement of the throttle tends to reduce the pressure at the venturi, it follows that the device will operate to insure that the pressure at the venturi will never exceed a predetermined maximum. Of course, if the manual throttle 13 is closed to an extent such as to produce pressures below the predetermined value, the auxiliary throttle will be fully open and my device will not be operating to exercise any pressure-regulating function.

When the device is operating to perform its pressure-regulating function it does not maintain absolutely constant the pressure controlling the element 25. This follows from the fact that some change in the controlling pressure is necessary to produce movement of the auxiliary throttle. As a result, the pressure at the throat of the aspirator 19, which in this instance is the pressure controlling the element 25, will decrease upon an increase in the velocity of mixture-flow through the conduit 10, and vice versa, the extent of the changes in such pressure varying in a sense opposite to that of the sensitivity of the device—i. e., the amount of movement of the auxiliary throttle 15 produced by any given change in the controlling pressure.

If it were not for the venturi—i. e., if the aspirator 19 discharged into an unconstricted portion of the mixture conduit—the static pressure of the mixture supplied to the engine would be the pressure controlling the element 25 and would decrease when the velocity of mixture flow through the conduit 10 increased. This, for reasons which will be made apparent hereinafter, would be an undesirable result; and I prefer to have the device operate to increase the pressure of the mixture as its velocity of flow increases. This method of control is facilitated in the device of Fig. 1 through the use of the venturi 16.

In the arrangement illustrated in Fig. 1, where the aspirator 19 discharges at or slightly beyond the constricted throat of the venturi 16, the pressure at the venturi will be the pressure which, modified by the aspirator 19 controls the element 25 and the position of the auxiliary throttle, and will be lower than the pressure of the mixture beyond the venturi by an amount equal to the pressure-differential which the venturi creates. As is well known, this pressure-differential will increase with increased velocities of mixture-flow. By properly proportioning the venturi with due regard to the sensitivity of the automatic control, it is possible to offset the effect of increased velocities of flow in reducing pressure at the Venturi-throat.

To make this apparent, consider the device operating to exercise its pressure-regulating function with the auxiliary throttle 15 in an intermediate position and therefore creating a pressure-drop. If an increase in the velocity of mixture-flow occurs, pressures at all points in the mixture-conduit will decrease; but if the auxiliary throttle is then opened to a point such that the change in the pressure-drop it creates will equal the decrease in pressure incident to the increased velocity of flow, the pressure in the mixture conduit posterior to the auxiliary throttle will be restored to its original value. Because of the increased velocity of flow, however, the pressure at the venturi will be lower than its original value by an amount dependent upon the degree of constriction which the venturi provides. If this decrease in pressure at the Venturi-throat is such as will produce the assumed opening of the auxiliary throttle, then the device, when operating, will maintain an approximately constant pressure in the mixture-conduit between the auxiliary throttle and the venturi. If the venturi is further constricted, the effect of changes in mixture-velocity upon Venturi pressures (and, therethrough, upon the position of the auxiliary throttle) will be augmented, and an increase in the mixture velocity will result in an increased pressure within the mixture-conduit between the auxiliary throttle and the venturi. Since the venturi is responsible for but a slight loss of head, the same would be true of the pressure immediately posterior to the venturi.

For at least two reasons, I prefer to so coordinate the venturi to the sensitivity of the automatic throttle control that an increase in the velocity of mixture flow will produce an increase in mixture pressure. In the first place, because of higher friction losses at higher speeds, the maintenance of a constant static pressure at an intermediate point in the mixture-supply conduit would result in a gradual drop in the static pressure of the gases entering the engine cylinders as the rate of mixture flow increased, and in a consequent drop in compression pressures. In the second place, as engine speeds increase it is customary to advance the time of ignition in the cycle, and in order to maintain the desired pressure at the moment of ignition it is necessary to increase the charge supplied to each cylinder. It is therefore seen that the function of the venturi 16 in modifying the pressure which controls the auxiliary throttle is highly important; for, if the pressure responsive element 25 were responsive to unmodified static pressure in the mixture conduit, the charge per cylinder would decrease with increased engine speed, and, further, it would be impossible to take advantage of the fact that with increased speed an increased charge per cylinder is possible without increasing the pressure at the moment of ignition.

As previously indicated, the modification of the present invention illustrated in Fig. 1 is intended for use in conjunction with a vacuum-lift fuel-supply system which is operated, in the manner set forth in my prior application Serial No. 101,214, by the vacuum existing at the throat of the aspirator 19 and transmitted to the vacuum-lift apparatus through a tube 20. As my present invention is not at all concerned with the vacuum-lift fuel-feed, I am not describing details thereof herein. I may mention, however, that when my invention is to be used in association with a vacuum-lift fuel-feeding system, the presence of the aspirator 19 increases the vacuum available for the operation of such apparatus, while the presence of the automatic throttle control prevents the vacuum from dropping, even momentarily, to a point such that the fuel-feeding system would become inoperative.

When my invention is not to be used in association with any such vacuum-operated apparatus as the fuel-feeding system forming the subject matter of my prior application, I prefer to locate the conventional manually controlled throttle 13 between the automatically regulated throttle 15 and the engine as shown in Fig. 2. In the construction there illustrated, I have provided an aspirator 35 which receives air from atmosphere and discharges through a passage 36 into the conduit 10 at a point therein anterior to the auxiliary throttle 15. As shown, the passage 36 communicates with the mixture conduit at the throat of a venturi 37, but that is not essential. The venturi 37 illustrated in Fig. 2 is the conventional carburetor venturi, and contains at its throat the usual fuel-discharge nozzle 38. Desirably, communication of the passage 36 with conduit 10 is by way of a continuous annular port 39 in order to reduce the possibility of an uneven distribution of the air which enters the conduit 10 from the passage 36.

The throat of the aspirator 35 is connected through a passage 41 with the mixture-conduit 10 at a point 42 beyond, but desirably close to, the auxiliary throttle 15. At an intermediate point in its length, the passage 41 receives the discharge from a second aspirator 44. Pressures at the throat of this second aspirator are transmitted to the pressure-responsive element 25 through a passage 45. The pressure-responsive element 25 operates as before to tend to open the auxiliary throttle 15 upon any drop in static pressure at the throat of the aspirator 44.

In the device illustrated in Fig. 2, the pressure-responsive element 25 and the throttle 15 which it controls will be responsive to the static pressure in the conduit 41 at the point where the aspirator 44 discharges into it. The static pressure at this point will be at a value between the static pressure at the throat of the aspirator 35 and the static pressure within the mixture conduit 10 at the point 42 where the passage 41 is connected to it. Since the pressure at the throat of the aspirator 35 will vary in the same sense as the static pressure at the port 39, the auxiliary throttle 15 will be jointly responsive to the static pressures at points in the conduit 10 on opposite sides of the auxiliary throttle 15.

If the device of Fig. 2 is to be used with an engine from which maximum power is desired, it is so designed that when the engine is running at maximum speed the auxiliary throttle 15 will be substantially fully open. If a load is imposed upon the engine, its speed will decrease and static pressures at all points along the mixture conduit will increase. The increase in pressure at the port 39 will produce a larger increase in the pressure at the throat of the aspirator 35; and, since pressures at both ends of the passage 41 are increased, the pressure at the throat of the aspirator 44 will increase, and the pressure-responsive element 25 will move the auxiliary throttle 15 toward closed position. The partial closing of the auxiliary throttle 15 will effect a decrease in static pressure at the point 42, which will be reflected in a decrease in static pressure along the passage 41 with the result that when the engine speed becomes constant under the increased load a condition of equilibrium will be established in which the auxiliary throttle 15 will remain stationary in a position such that it will maintain the static pressure of the gases supplied to the engine at the desired value.

The device illustrated in Fig. 2 is considerably more flexible than that illustrated in Fig. 1. In the latter, throughout the entire range of conditions occurring in engine operation, there is a fixed relation between the respective effects on the auxiliary throttle of static pressure in the mixture conduit and of the rate of flow therethrough. For example, if the throat of the venturi 16 in the device of Fig. 1 is made smaller, the effect of changes in the rate of mixture flow upon the position of the auxiliary throttle 15 will be augmented, and this augmentation will be effective throughout the entire range of conditions encountered. Further, the only way in which the effect of the rate of mixture flow upon the position of the auxiliary throttle 15 can be varied is by changing the diameter of the throat of the venturi 16; and, as a result, the obtaining of optimum performance would require troublesome and expensive experimentation with venturis having throats of special design and different diameters.

The device of Fig. 2 is not subject to the limitations possessed by the device of Fig. 1. In order to obtain desired regulation of the device illustrated in Fig. 2, I may provide in the passage 41 a pair of replaceable orifices 47 and 48, the former being located between the aspirator 35 and the aspirator 44 and the latter between the aspirator 44 and the point 42. In addition, I may provide the discharge passage of the aspirator 44 with an orifice 49.

By changing the sizes of the respective orifices 47, 48, and 49, I can obtain a wide range of effects. The orifice 47 modifies the effect of the rate of mixture flow upon the pressure-responsive element 25, an increase in the size of the orifice increasing the effect of the rate of mixture flow upon the pressure-responsive element, and vice versa. The size of the orifice 48 modifies the effect of static pressure at the point 42 upon the pressure-responsive element 25, an increase in the size of the orifice 48 increasing that effect, and vice versa. The size of the orifice 49 modifies the rate of flow through the aspirator 44. It will have little effect when the static pressure between the orifices 47 and 48 is relatively high; but when the static pressure between the orifices 47 and 48 is relatively low, it will restrict flow through the aspirator 44 and increase beyond what it otherwise would be the pressure to which the element 25 is responsive.

As previously indicated, when my device is used to maintain desired compression pressures in the engine, I ordinarily prefer that it operate to increase compression pressures as the engine speed, and the rate of mixture-flow increases. This result is readily obtained in the device of Fig. 2 by making the orifice 47 large enough relative to the orifice 48.

In the device of Fig. 2 flow through the passage 41 may be in either direction depending upon the position of the auxiliary throttle and the rate of flow through the conduit 10. If the pressure at the throat of the aspirator 35 is lower than that at the point 42, as it would be with the auxiliary throttle open and at high rates of mixture flow, flow in the passage 41 will be toward the aspirator 35. On the other hand, if the pressure at the throat of the aspirator 35 is higher than that at the point 42, as it would be with the auxiliary throttle near closed position and at low rates of mixture flow, then the direction of flow through the conduit 41 will be toward the point 42. In either event, however, the pressure in the conduit 41 between the orifices 47 and 48 will depend jointly upon the pressures at the point 42 and at the throat of the aspirator 35.

By proper co-ordination of the sizes of the orifices 47, 48, and 49, both in respect to each other and in respect to the response of the pressure-responsive device, the device of Fig. 2 can readily be adapted to effect satisfactory control of mixture pressures at both extreme conditions of high-load, low-speed and light-load, high-speed. In certain engines, however, while mixture pressures may be as desired at both such extreme conditions, the mixture-pressure at conditions between the two extremes may be too low. I find that this is most apt to occur in engines of extremely high-compression ratio and over the range of intermediate conditions adjacent low-speed, high-load operation. That is, the device may function to provide satisfactory mixture-pressures at full-load, low-speed operation, may provide pressures which are too low as the load is decreased and the speed increased to a certain point, and may again provide satisfactory pressures as maximum engine speed is approached.

When the conditions just described are encountered, the device of Fig. 2 is inadequate to provide optimum mixture-pressures over the entire range of engine operation. Enlarging the orifice 47 would tend to make the automatic throttle open more rapidly as engine-speed increased from its minimum, and so would tend to raise mixture-pressures to the desired value at the lower intermediate speeds. However, in order to maintain the desired pressure at the minimum speed, it would then be necessary to offset the effect of enlarging the orifice 47, as by reducing the spring-loading in the pressure-responsive element 25. The device might then provide satisfactory control at the minimum speed and for a considerable speed-range above the minimum; but, as higher speeds are approached, the combined effect of the larger orifice 47 and the lighter spring-load on the pressure-responsive element would result in a throttle opening which is too great, in mixture-pressures which are too high, and in danger of pre-ignition.

To overcome the limitations of the device of Fig. 2, I may employ the structure illustrated in Fig. 3, with which it is possible to maintain the desired mixture-pressure at minimum speed, to increase mixture-pressure to desired values over the lower intermediate speeds, and to avoid dangerously high mixture-pressures at the higher speeds. The device of Fig. 3 is essentially the same as that of Fig. 2 except for the additions of an orifice 55 in the passage 41 between the orifice 48 and the aspirator 44 and of a bleed-passage 56 connecting the space between the orifices 48 and 55 with the throat of the aspirator 35. When, at high engine speeds, the flow through the passage 41 is toward the aspirator 35, air bled through the bleed-passage 56 increases the pressure at the throat of the aspirator 35, and accordingly increases the pressure against which the aspirator 44 discharges, increases the pressure at the throat of that aspirator, and thus tends to close the automatic throttle 15. While the presence of the bleed-passage also modifies the pressure against which the aspirator 44 discharges when, at low engine speeds, flow through the passage 41 is toward the point 42, this effect of the bleed passage is much less than when flow through the passage 41 is in the opposite direction.

By providing the bleed-passage 56 with an orifice 57, and by properly co-ordinating the size of that orifice with the size of orifice 55, it is possible to vary the extent of bleeding which the passage 56 provides, and so possible to offset, at high engine speeds, the effect of other adjustments which, at lower engine speeds, tend to increase the opening of the automatic throttle 15 and thereby to increase mixture-pressures.

Another expedient which may be employed to lower mixture-pressures at high engine-speeds while permitting adjustments favoring higher mixture-pressures over the lower speed range is illustrated in Fig. 4. This arrangement is identical with that illustrated in Fig. 2 except that the passage 41 has been re-arranged in such a manner that when flow through it is toward the aspirator 35 the mixture which enters the passage 41 at the point 42 and passes through the orifice 48 will impinge upon the air discharged from the aspirator 44. The effect of this impingement will be to increase the effective pressure against which the aspirator 44 discharges, to increase the pressure to which the control device 25 is responsive, and thus to cause a partial closing of the automatic throttle and a reduction in the pressure of the mixture. Since the impingement referred to occurs only when flow through the passage 41 is toward the aspirator 35, or at the higher engine speeds, the re-arrangement of the passage 41 is without material effect at lower engine speeds when flow is in the opposite direction.

While impingement of gases against the discharge of the aspirator 44 does tend to reduce mixture-pressures at the higher engine speeds, its effect is relatively uncertain and difficult to control. Therefore, when it is necessary to reduce mixture pressures at high speeds in a manner unattainable with the device of Fig. 2, I prefer the modification of Fig. 3 to that of Fig. 4. In many situations, however, no modification of the device shown in Fig. 2 is necessary.

The response of the automatic throttle 15 to changes in the pressure and velocity of the mixture supplied to the engine will depend not only upon the character of the aspirators and the relative size of the orifices, but also upon a number of other factors including the character of the interconnection between the pressure-responsive element 25 and the automatic throttle, the angle at which the throttle 15 closes, the extent (if any) to which the throttle 15 is unbalanced, and the character of the yielding means which opposes movement of the diaphragm of the pressure-responsive element. In all the modifications illustrated, I have shown a simple link and crank connection between the automatic throttle and the diaphragm of the pressure-responsive element; but connections of other character might be used if desired. In the drawings, I have shown the throttle 15 as balanced, but my invention is not limited to balanced throttles. Of course, if an unbalanced throttle is used the effect of the mixture-stream in tending to open or close it will have to be taken into account.

In the device of Fig. 1, the yielding means opposing movement of the diaphragm 26 consists of a single spring 27; but in the device of Fig. 2, such yielding means is shown as comprising a pair of springs 60 and 61, the former of which acts between a fixed abutment and a movable abutment 62 and the latter of which acts between the abutment 62 and the diaphragm. These two springs may be arranged in various ways to produce obvious effects on the response of the diaphragm 26 to changes in the effective pressure upon it. For example, the spring 60 may act to hold the movable abutment 62 against a fixed abutment 63 with a force which is between the limits of the force to be exerted on the diaphragm. With such an arrangement, the response of the diaphragm to pressure changes within the casing 25 will be greater when the throttle 15 is near open position than it will be when the throttle is near closed position; because, until opening movement of the throttle has progressed far enough to move the abutment 62 from the abutment 63 only the spring 61 will yield under pressure-changes.

When my control device is used in association with carburetors which embody a choke valve for the purpose of enriching the mixture during starting it will in most instances be necessary to close the aspirator 35, and perhaps also the aspirator 44, when the choke valve is closed, as otherwise the aspirator would bleed enough air to weaken or destroy the choking effect. In such a situation, I may employ the arrangement shown in Fig. 5, where the mixture passage 10 and the aspirator 35 both receive air through an intake conduit 65 containing a choke valve 66. With such an arrangement, closing of the choke valve cuts off the supply of air not only to the mixture passage but also to the aspirator 35. If, as is shown, the inlet of the aspirator 35 is arranged to be exposed to the impact of the air flowing through the conduit 65, it will operate, when the choke-valve 66 is open, substantially the same as if it received air directly from atmosphere as in the other arrangements illustrated.

Ordinarily, only the aspirator 35 need be arranged to be under the control of the choke valve, because the aspirator 44 will usually be so small that the air it would pass would have an immaterial effect on choking. I have found that, at least to a large extent, the respective sizes of the aspirators 35 and 44 may be independent of the size of the engine with which the device is to be used.

Ordinarily, the throat-diameter of the aspirator 35 should not be less than one-eighth of an inch, and may be considerably larger; although there is rarely any necessity for making it larger than three-eighths of an inch. The aspirator 44 is preferably considerably smaller, say with a throat diameter of 0.055 to 0.070 inch. The aspirator 35 is desirably provided with a continuous annular port for the admission of air from the passage 41 in order to reduce the formation of eddies interfering with its capacity, and its capacity to admit air to the passage 41 should be relatively high—i. e., flow through the passage 41 should depend upon the respective sizes of the orifices therein rather than upon any restriction at the throat of the aspirator.

Since the devices described operate by inducing a flow of air from atmosphere, it might be thought that they would not operate to effect the desired control if the static pressure within the mixture conduit dropped below the critical pressure. I find, however, that the devices do operate to effect the desired control, even when a manometer attached to the mixture conduit indicates pressures below the critical value. I believe this to be due to the fact that the manometer indicates an average value, whereas flow through the aspirators in my device is responsive to instantaneous values of pressures within the mixture conduit. It is a recognized fact that instantaneous pressures within the mixture supply conduit of an internal combustion engine may pulsate widely, even though the engine is running smoothly at a constant speed. Accordingly, while a manometer attached to the supply conduit may indicate a pressure below the critical value, there will be one or more short intervals during each cycle of pulsation in which the static pressure within the mixture supply conduit will be above the critical value. As a result, my mixture control device will continue to operate to modify the position of the automatic throttle 15 until the highest instantaneous pressure within the mixture supply conduit drops below the critical value. The automatic throttle 15, because of friction and inertia in the parts of the pressure-responsive device, does not follow rapidly fluctuating pressures at the throat of the aspirator to which it is connected, but instead assumes a position dependent upon the average value of such fluctuating pressures.

As has been noted, the function of the aspirators 19 and 35 is to augment the effect of pressure changes within the intake conduit. It may be, in some cases, that pressure changes within the intake conduit will be sufficient to provide the desired effect in the absence of the augmentation which the aspirator 19 or 35 provides. In that event, the aspirator may be eliminated. Elimination of the aspirator 19 in Fig. 1 would involve merely a direct connection between the casing 25 and the passage 18. In the other modifications shown, the upper end of the passage 41, beyond any orifices therein, would be connected directly to the port 39. If the aspirator 19 (or 35) is eliminated, I find it desirable to employ in the mixture passage a venturi (16 or 37) which has a skirt-length comparable to that employed in aspirators.

Certain advantages, other than those already mentioned, which my control device possesses result from the partial throttling which exists at all times except when the engine is operating at high speeds. Thus, the throttling produces turbulence and reduces pressures, thus favoring vaporization and even distribution of fuel. The throttling action, and its gradual decrease as speed increases prevents a sudden opening of the manual throttle from creating an excessively lean mixture. The temperature reduction which accompanies throttling, tends to prevent pre-ignition, and may be availed of for other purposes, as for cooling the fuel in the carburetor.

The extent of control of compression pressures effected by my device may vary, depending upon the conditions desired. Thus, the compression pressures may be different when maximum efficiency is desired from what they are when maximum power is desired. The maximum compression pressure attainable is of course limited by the nominal compression ratio of the engine; but, if desired, the control device may be so adjusted that such maximum compression pressure is never attained.

It has previously been pointed out that when the manually controlled throttle 13 is partially closed it, rather than the automatic throttle 15, may determine the mixture pressure. In the device of Fig. 2, the manually controlled throttle 13, when partially closed, may produce somewhat the same effect, although to a lesser extent. That is, if the manual throttle is closed or partly closed it will create a loss of head in the mixture conduit, and the pressure of the mixture entering the engine cylinders will be lower than it would be if the automatic throttle were in sole control. Thus, in the device of Fig. 2, as in the device of Fig. 1, while the manual throttle may affect mixture pressures, it cannot create higher mixture pressures than would exist in its absence, and the automatic throttle therefore operates to impose a predetermined maximum which mixture pressures cannot exceed. This maximum, however, is not constant for all engine speeds and rates of mixture flow, but instead increases as engine speeds and rates of mixture flow increase.

I have referred above to the effect upon the aspirator, as well as upon the automatic throttle 15, of mixture-conduit pressures which fluctuated between values respectively above and below the critical pressure. However, the effect upon the automatic throttle of rapidly-fluctuating pressures in the mixture conduit is noticeable even when the minimum instantaneous mixture-conduit pressure is well above the critical. This results from the fact that rapid fluctuations in the pressure against which an aspirator discharges tend to raise the pressure at the aspirator throat, even though the average (or manometer) pressure against which the aspirator discharges remains unchanged. As a result, under the same average fluid pressure at the throat of the venturi 16, the average pressure at the throat of the aspirator will be lower, and the throttle 15 will be nearer open position, when mixture-conduit pressures are relatively constant than when mixture-conduit pressures fluctuate rapidly.

Because of the effect thus noted, the automatic throttle is responsive to three factors; i. e., the average (or manometer) pressure of the mixture supplied to the engine, the rate of mixture supply, and rapid pulsations in mixture-pressure. Especially when used in association with an ordinary automobile engine or other engines in which the valve-timing is arranged to produce relatively high efficiency at high speed, the effect of pressure-pulsations upon the throttle 15 compounds the effect of engine speed. At low speeds in such an engine, the late closing of the inlet valve results in the momentary expulsion of mixture from the cylinder into the manifold and in a consequent temporary rise of pressure in the supply conduit. Under extreme conditions, pressure in the supply conduit may momentarily reach a superatmospheric value. As engine speeds increase, however, this effect of late inlet-valve closing becomes less and less and rapid pressure-pulsations in the mixture-supply conduit decrease in extent. The decrease in the extent of such pressure-pulsations tends, as above brought out, to move the throttle 15 toward open position or to affect the throttle 15 in the same sense as does an increase in engine speed.

The effect of cyclic pressure-pulsations in the mixture conduit upon the position of the automatic throttle 15 is especially important in view of the practical limitations imposed upon the size of the venturi 16. If this venturi is made large enough to avoid undue choking of mixture-supply at high engine speeds its effect in creating a pressure-drop which varies with the rate of mixture-flow and in thereby imposing a speed-response on the automatic throttle 15 at low speeds may be negligible. But with the effect of cyclic pressure-pulsations which decrease in extent as engine speed increases superposed upon the effect of the venturi, I can readily obtain in the throttle 15 a substantial degree of speed-response at low engine speeds with a venturi large enough not to produce an undue choking at high engine speeds.

I claim as my invention:

1. Means for controlling the pressure of explosive mixture supplied to an internal combustion engine having a mixture-supply conduit, comprising a valve in said conduit, a venturi in said conduit, and pressure-responsive mechanism operatively connected to said valve and responsive at least in part to static pressure at said venturi for moving said valve toward closed position upon an increase in such static pressure, and vice versa, said venturi and pressure-responsive mechanism being proportioned to maintain throughout the lower half of the engine's speed-range mixture-pressures materially lower than those maintained at engine speeds near the maximum.

2. The invention set forth in claim 1 with the addition that said venturi is posterior to said valve.

3. The invention set forth in claim 1 with the addition that said venturi is anterior to said valve.

4. Means for controlling the pressure of explosive mixture supplied to an internal combustion engine having a mixture-supply conduit, comprising a valve in said conduit, and a pressure-responsive device operatively connected to said valve and continuously responsive in part to static pressure at a point within said conduit and anterior to said valve for moving said valve toward open position upon a decrease in such static pressure.

5. Mechanism for controlling the flow of mixture through the intake conduit of an internal combustion engine, comprising a valve in said conduit, a continuously open by-pass communicating with said conduit on opposite sides of said valve, and means including a pressure-responsive element responsive to fluid pressure at an intermediate point of said by-pass for automatically regulating said valve.

6. The invention set forth in claim 5 with the addition of an auxiliary by-pass communicating with said first named by-pass on opposite sides of such intermediate point therein.

7. Mechanism for controlling the flow of mixture through the intake conduit of an internal combustion engine, comprising a valve in said conduit, an aspirator discharging into said conduit at a point therein anterior to said valve, a second conduit connecting the throat of said aspirator with a point in said mixture conduit posterior to said valve, and means including a pressure-responsive element responsive to fluid pressure at an intermediate point in said second conduit for automatically regulating said valve.

8. In combination with the intake conduit of an internal combustion engine, a throttle disposed in said conduit, a suction controlled element, means for producing a sub-normal pressure to control said suction controlled element, said means to include a multiple by-pass around said throttle.

9. Mechanism for controlling the supply of explosive mixture through the intake conduit of an internal combustion engine, comprising a valve in said conduit, an aspirator discharging into said conduit at a point between said valve and the engine, and means responsive at least in part to fluid pressure at the throat of said aspirator for moving said valve toward closed position upon an increase in fluid pressure within said conduit.

10. Mechanism for controlling the supply of explosive mixture through the intake conduit of an internal combustion engine, comprising a valve in said conduit, a venturi disposed in said conduit between said valve and the engine, an aspirator discharging into the throat of said venturi, and means responsive at least in part to fluid pressure at the throat of said aspirator for moving said valve toward closed position upon an increase in fluid pressure at the throat of said venturi.

11. Mechanism for controlling the supply of explosive mixture through the intake conduit of an internal combustion engine, comprising a valve in said conduit, an auxiliary conduit discharging into said intake conduit at a point between said valve and the engine and through which fluid-flow is induced by sub-atmospheric pressure at such point, and means responsive at least in part to fluid pressure at an intermediate point in said auxiliary conduit for moving said valve toward closed position upon an increase in fluid pressure within said intake conduit.

12. The method of controlling the compression pressure in the cylinders of an internal combustion engine operable at varying speeds and provided with manually operable mechanism controlling a throttle, which method comprises automatically controlling the pressure of gaseous fluid supplied to the engine so as to prevent such pressure from exceeding a predetermined maximum irrespective of the setting of said mechanism, maintaining such maximum pressure at a relatively low value at minimum engine speed, and automatically increasing such maximum pressure as engine speed increases, and automatically decreasing such maximum pressure as the engine speed decreases.

13. The method of controlling the supply of gaseous fluid to an internal combustion engine operable at varying speeds and provided with manually operable mechanism controlling a throttle, which method comprises automatically controlling the pressure of gaseous fluid supplied to the engine so as to prevent such pressure from exceeding a predetermined maximum irrespective of the setting of said mechanism, maintaining such maximum pressure at a relatively low value at minimum engine speed, and automatically increasing such maximum pressure as engine speed increases and automatically decreasing such maximum pressure as the engine speed decreases.

14. The method of controlling the compression pressure in the cylinders of an internal combustion engine operable at varying speeds, which method comprises creating a resistance to the flow of gaseous fluid to the engine cylinders and automatically controlling said resistance in accordance jointly with the pressure of such fluid and the speed of the engine to maintain the pressure of such fluid below a predetermined value which is a minimum at minimum engine speed and which increases as engine speed increases and which decreases as engine speed decreases.

HAROLD W. MEADE.